(12) United States Patent
Dhanyamraju et al.

(10) Patent No.: US 11,616,652 B2
(45) Date of Patent: Mar. 28, 2023

(54) DATA SECURITY USING A BLOCKCHAIN LEDGER

(71) Applicant: HCL Technologies Limited, Uttar Pradesh (IN)

(72) Inventors: S U M Prasad Dhanyamraju, Hyderabad (IN); Sriganesh Sultanpurkar, Hyderabad (IN); Shiva Kumar Sholayappan, Hyderabad (IN); Mounika Kalidindi, Hyderabad (IN); Nandini Matam, Hyderabad (IN)

(73) Assignee: HCL Technologies Limited, Noida (IN)

( * ) Notice: Subject to any disclaimer, the term of this patent is extended or adjusted under 35 U.S.C. 154(b) by 0 days.

(21) Appl. No.: 16/816,964

(22) Filed: Mar. 12, 2020

(65) Prior Publication Data
US 2020/0295943 A1    Sep. 17, 2020

(30) Foreign Application Priority Data
Mar. 15, 2019    (IN) .............................. 201911010244

(51) Int. Cl.
*H04L 29/06* (2006.01)
*H04L 9/32* (2006.01)
*G06F 11/07* (2006.01)
*H04L 9/00* (2022.01)

(52) U.S. Cl.
CPC ........ *H04L 9/3239* (2013.01); *G06F 11/0727* (2013.01); *H04L 9/3297* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 6,557,009 B1* | 4/2003 | Singer | G06Q 10/10 |
| | | | 715/740 |
| 10,504,174 B2* | 12/2019 | Loganathan | G06Q 40/03 |
| 10,742,393 B2* | 8/2020 | Wooden | H04L 63/12 |
| 11,074,303 B2* | 7/2021 | Sabharwal | G06N 3/08 |
| 11,132,660 B2* | 9/2021 | Sidhu | G06Q 20/223 |
| 11,226,319 B1* | 1/2022 | Sunseri | G01N 33/146 |
| 2012/0297308 A1* | 11/2012 | Anikul | G06Q 30/02 |
| | | | 715/738 |
| 2013/0031143 A1* | 1/2013 | Katiyar | G06F 16/951 |
| | | | 707/E17.03 |
| 2016/0260169 A1* | 9/2016 | Arnold | G06Q 20/381 |
| 2017/0011460 A1* | 1/2017 | Molinari | G06Q 40/06 |

(Continued)

FOREIGN PATENT DOCUMENTS

KR    20200053239 A  *  5/2020  ............. G06F 21/60

*Primary Examiner* — Eleni A Shiferaw
*Assistant Examiner* — Hassan A Hussein

(57) ABSTRACT

Systems and methods for data security using a blockchain ledger. The system receives request associated with a product from a user. The system further obtains data associated with the product upon receiving the request. Further, the system analyses the data to using predefined parameters identify valid data and invalid data. Upon identification, the system uploads the valid data in the blockchain ledger. Further, the valid data may be displayed to the user through a channel, associated with the user, in the blockchain ledger, thereby providing the data security.

12 Claims, 3 Drawing Sheets

(56) References Cited

U.S. PATENT DOCUMENTS

| | | |
|---|---|---|
| 2017/0206532 A1* | 7/2017 | Choi ................. G06Q 30/02 |
| 2017/0243287 A1* | 8/2017 | Johnsrud ............ G06Q 20/02 |
| 2018/0040064 A1* | 2/2018 | Grigg ................ H04L 41/147 |
| 2018/0068130 A1* | 3/2018 | Chan ................. G06F 21/64 |
| 2018/0101906 A1* | 4/2018 | McDonald .......... G06Q 20/204 |
| 2018/0287780 A1* | 10/2018 | Safford .............. G06F 21/575 |
| 2018/0308134 A1* | 10/2018 | Manning ............. G06Q 30/08 |
| 2019/0268407 A1* | 8/2019 | Zeng ................. H04L 67/1091 |
| 2020/0076798 A1* | 3/2020 | Lidsky ............... H04L 63/083 |
| 2020/0110792 A1* | 4/2020 | Tsabba .............. G06F 3/167 |
| 2020/0117690 A1* | 4/2020 | Tran ................. G06F 16/90332 |
| 2020/0119905 A1* | 4/2020 | Revankar ............ G06Q 20/02 |
| 2020/0125914 A1* | 4/2020 | Wurmfeld ........... G06Q 20/352 |
| 2020/0228530 A1* | 7/2020 | Zlotnick ............. H04L 63/10 |
| 2020/0374106 A1* | 11/2020 | Padmanabhan ..... G06F 16/1837 |
| 2021/0133735 A1* | 5/2021 | Maim ................ G06Q 20/06 |
| 2021/0251027 A1* | 8/2021 | Narayanasamy Naidu ................ H04W 4/80 |
| 2021/0390209 A1* | 12/2021 | Lee .................. G06F 21/6254 |

* cited by examiner

DATA SECURITY USING A BLOCKCHAIN LEDGER

CROSS-REFERENCE TO RELATED APPLICATIONS AND PRIORITY

The present application claims benefit from Indian Complete Patent Application No. 201911010244 filed on 15 Mar. 2019, the entirety of which is hereby incorporated by reference.

TECHNICAL FIELD

The present disclosure in general relates to the field of data security. More particularly, the present invention relates to a system and method for data security using a blockchain ledger.

BACKGROUND

Generally, instrumentation data is an important part for a product which is being used in a field. The instrumentation data provides a product company, an app usage metrics, a system usage metrics, a network usage metrics, and other information associated with the product. It is to be noted that data security plays an important role while sharing the instrumentation data with a customer. This is because, sensitive information regarding an organization or other customers should not be shared with the customer.

SUMMARY

Before the present systems and methods for data security using a blockchain ledger, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for data security using the blockchain ledger. This summary is not intended to identify essential features of the claimed subject matter nor is it intended for use in determining or limiting the scope of the claimed subject matter.

In another implementation, a method for data security using a blockchain ledger is illustrated. The method may comprise receiving a request associated with a product from a user. The request may comprise a product name, a list of product attributes, a channel associated with the user, and a blockchain ledger associated with the channel. The method may further comprise obtaining data associated with the product upon receiving the request. The data may comprise a primary list of product attributes, a transaction ID, and a time stamp. Further, the method may comprise identifying valid data and invalid data from the data based on analysis of the data using predefined parameters. The method may further comprise uploading the valid data to the blockchain ledger. Further, the method may comprise displaying the valid data to the user through the channel in the blockchain ledger, thereby providing data security.

In one implementation, a system for data security using a blockchain ledger is illustrated. The system comprises a memory and a processor coupled to the memory, further the processor is configured to execute programmed instruction stored in the memory for receiving a request associated with a product from a user. The request may comprise a product name, a list of product attributes, a channel associated with the user, and a blockchain ledger associated with the channel. The processor may be further configured to execute the programmed instructions stored in the memory for obtaining data associated with the product upon receiving the request. The data may comprise a primary list of product attributes, a transaction ID, and a time stamp. Further, the processor may execute the programmed instructions stored in the memory for identifying valid data and invalid data from the data based on analysis of the data using predefined parameters. The processor may execute the programmed instructions stored in the memory for uploading the valid data to the blockchain ledger. Further, the processor may execute the programmed instructions stored in the memory for displaying the valid data to the user through the channel in the blockchain ledger, thereby providing data security.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "obtaining", "identifying", "uploading", "displaying", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for data security using a blockchain ledger are now described. The disclosed embodiments of the system and method for data security using the blockchain ledger are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for data security using a blockchain ledger is not intended to be limited to the embodiments illustrated, but is to be accorded the widest scope consistent with the principles and features described herein.

The present subject matter relates to providing data security using a blockchain ledger. In one embodiment, a request associated with a product may be received from a user. The request may comprise a product name, a list of product attributes, a channel associated with the user, a blockchain ledger associated with the channel and the like. Further, data associated with the product upon receiving the request. The data may comprise a primary list of product attributes, a transaction ID, a time stamp and the like. The data may be further analysed using predefined parameters. Based on the analysis, valid data and invalid data may be identified. The valid data may be further uploaded to the blockchain ledger. The valid data may be further displayed to the user through the channel in the blockchain ledger.

Figure 1:
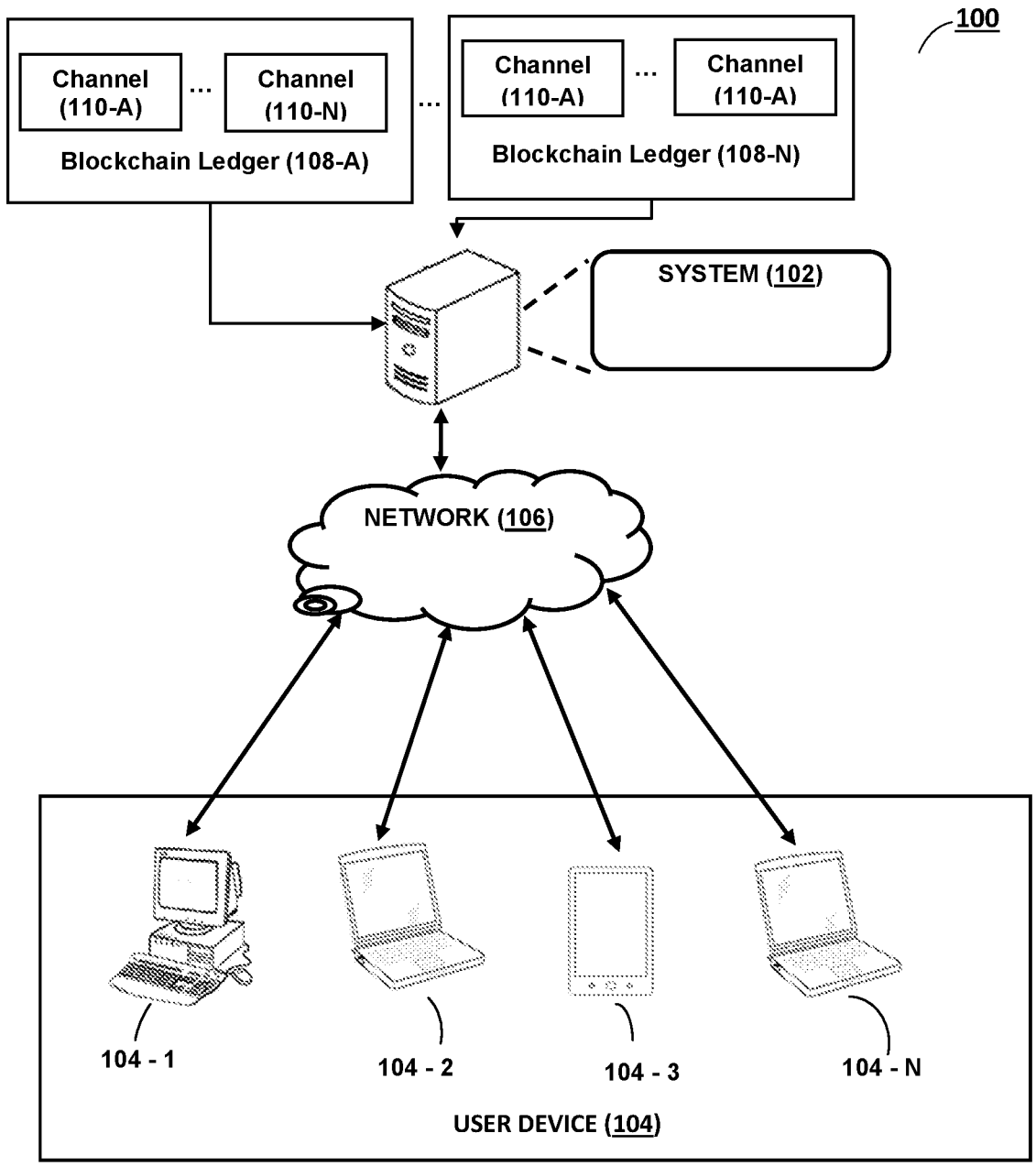
FIG. 1 illustrates a network implementation of a system for data security using a blockchain ledger, in accordance with an embodiment of the present subject matter.

Referring now to FIG. 1, a network implementation 100 of a system 102 for data security using a blockchain ledger is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2...104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Further, the system 102 may be connected to one or more blockchain ledgers 108-A, 108-B . . . , 108-N, collectively referred to as a blockchain ledger 108. It is to be noted that the blockchain ledger 110 may comprise one or more channels 110-A, 110-B, . . . , 110-N, collectively referred to as a channel 110. In one aspect, one or more users may have access to the channel 110. The blockchain ledger 108 may form a business network.

In one aspect, multiple configurations of channels and ledgers may be available in the business network. The multiple configurations may comprise a single channel and single ledger, a single channel and multiple ledgers, and multiple channels and multiple ledgers.

In the single channel and single ledger, each user of the business network may have common channel and ledger. Further, the data visible to each role involved in the business network may be differentiated by filtering transaction information. Every user in the business network may be able to see ledger information only specific to their instrumental data.

Further, in the single channel and multiple ledgers, each user of the business network may have common channel with different ledgers. The Instrumental data and transaction information submitted by the user may be recorded into user specific ledger. Every user in the business network may be able to see their ledger information.

Furthermore, in the multiple channels and multiple ledgers, each user may be connected to different channels and data privacy may be obtained by having one ledger per channel. Each user may be able to see multiple ledgers information to which user is connected.

In one embodiment, the system 102 receive a request from a user. The request may be associated with a product. The request may comprise a product name, a list of product attributed, the channel 110 associated with the user, the blockchain ledger 108 associated with the channel 110 and the like. In one example, the request may be received from a customer of the product.

Upon receiving the request, the system 102 may obtain data associated with the product. The data may comprise a primary list of product attributes, a transaction ID, a time stamp and the like. The data may be obtained from a product owner.

Further, the system 102 may analyse the data using predefined parameters. The predefined parameters may comprise rules, contracts associated with the product owner and the customer. Based on the analysis, the system 102 may identify valid data and invalid data from the data.

The system 102 may further upload the valid data in the blockchain ledger 108. Once the valid data is uploaded, the system 102 may display the valid data to the user through the channel 110 in the blockchain ledger 108. In other words, the valid data associated with the product may be available to the user in the business network. Further, the system 102 may store the invalid data in a repository. The system 102 may assign an error tag to the invalid data.

In another embodiment, the system 102 for data security may be accessed by a solution admin, a company Admin, a customer Admin, a telemetry agent and the like. In one aspect, the solution admin may be a chief admin who owns the product. The solution admin may enable on boarding of multiple Independent Software Vendor (ISV), Original Equipment Manufacturer (OEM), Service Provider Functional Team or Cross Function Team to the Product. It is to be noted that only those ISV, OEM, Service Provider Functional Team or Cross Function Team may participate as company admin in the business network and send data logs. Further, the solution admin may not have any access to the data logs of the business network.

Further, the company admin may add one or more products along with multiple attributes, on board customers, divisions or sub-divisions of an organization who are involved in the business network and assign company products to the customers. The company admin may further update, add or assign multiple product or versions, change the product attributes, and submit to next level viz., the Customer Admin. The company admin may view the one or more products to the customer and transaction performed on those products. The company admin may view only transaction id, timestamp, a product in transaction information. The customer admin may hold multiple products from different product companies. The customer admin may further on board the telemetry agent specific to product. In one embodiment, the customer admin may validate each product attributes as valid or invalid before submitting to the telemetry agent. The product and transaction information on the product performed by the telemetry agent and logs may be displayed. The telemetry information may comprise success information and failure information. The telemetry agent may submit transaction on the available product to the business network. In an ideal scenario, the telemetry agent may block the invalid data requests. It may restrict the user who is willing to access application or device related private or sensitive information along with performance metrics.

Further, the product transaction may be added to the ledger only if the valid attributes specified by customer admin are submitted. The transaction with invalid attributes may be considered as failure and irrespective of success or failure in transaction the complete transaction information is logged in corresponding customer admin log.

In one exemplary embodiment, consider a product vendor who have multiple products or apps that can pull private information of the user along with performance metrics. In this case, the system may restrict such scenarios providing data security and privacy of the information being leaked without business owner's knowledge.

Figure 2:
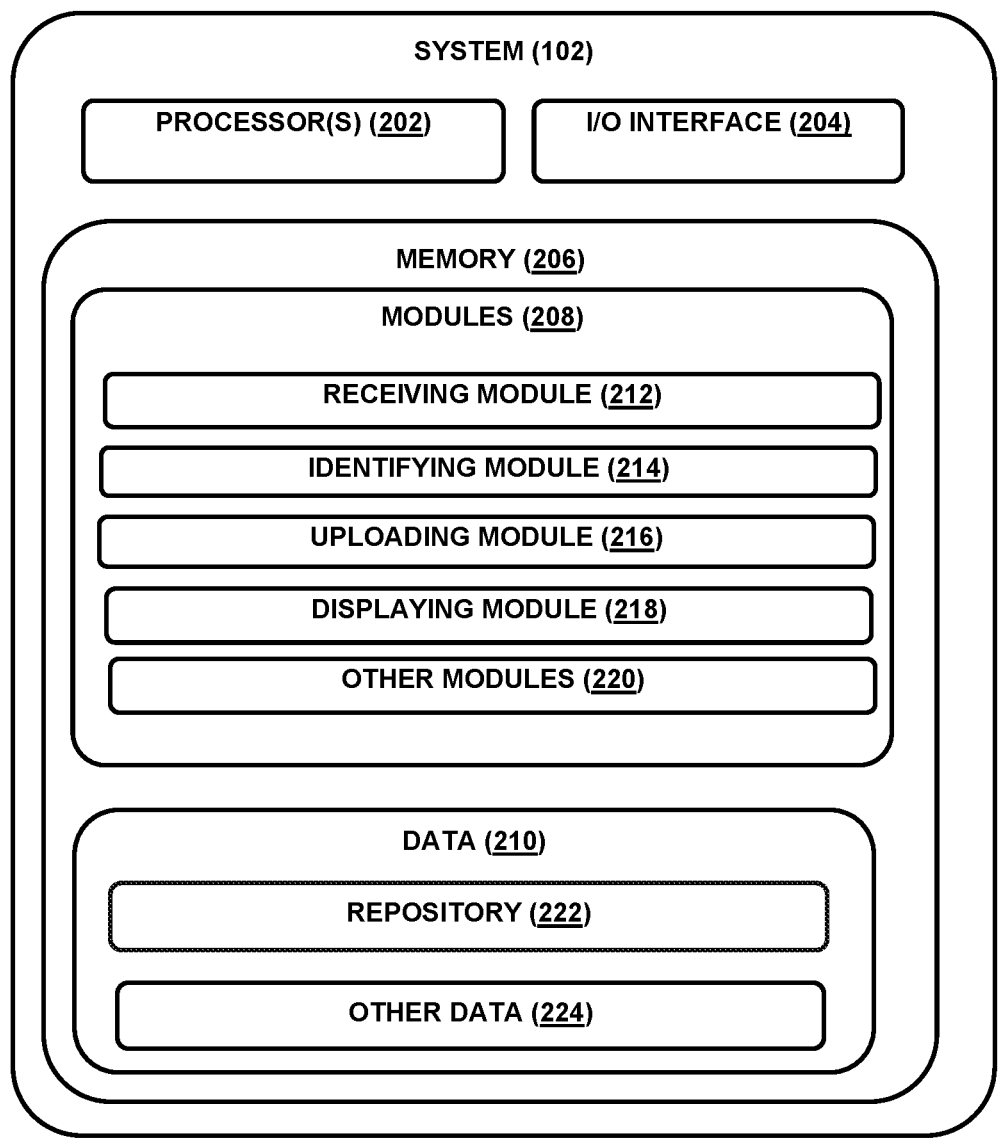
FIG. 2 illustrates the system for data security using the blockchain ledger, in accordance with an embodiment of the present subject matter.

Referring now to FIG. 2, the system 102 for data security using a blockchain ledger 108 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, an identifying module 214, an uploading module 216, a displaying module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may receive a request associated with a product. The request may be received from the user. In one example, the user may be a customer. The request may comprise a product name, a list of product attributes, a channel 110 associated with the user, a blockchain ledger 108 associated with the channel 110 and the like. In one aspect, the user may request for information associated with the product.

Once the request is received, the receiving module 212 may obtain data associated with the product. The data may be obtained from a database. The data may comprise a primary list of product attributes, a transaction ID, a time stamp and the like. In one example, the data associated with the product may be obtained from a product owner. The data may be referred to as instrumentation data associated with the product.

In one embodiment, product emitted data may be requested and received. Any sort of requests for data may from the customer or the product owner.

Upon obtaining the data, the identifying module 214 may identify valid data and invalid data from the data. The valid data and the invalid data may be identified based on an analysis of the data using predefined parameters. The predefined parameters may correspond to a set of rules, or a set of contracts between the customer and the product owner. In one embodiment, the data may be validated using the predefined parameter. If the data is correct as per the predefined parameters, then the data may be the valid data. If the data is not correct as per the predefined parameters, then the data may be the invalid data. Further, the valid data may indicate a successful transaction. The invalid data may indicate a failed transaction.

Further, the uploading module 216 may upload the valid data associated with the product to the blockchain ledger 108. In one embodiment, the uploading module 216 may identify the blockchain ledger 108 associated with the user. Once the blockchain ledger is identified, the valid data may be uploaded to the blockchain ledger.

Furthermore, the uploading module 216 may assign an error tag to the invalid data associated with the product. In one example, the error tag may indicate wrong data that should not be shared with the user. The uploading module 216 may further store the invalid data, the error tag and the like in the repository 222.

Upon uploading the valid data, the displaying module 218 may display the valid data to the user. The valid data may be displayed through the channel 110 associated with the user in the blockchain ledger 108. In one aspect, the channel 110 associated with the user in the blockchain ledger 108 may be identified. Further, the valid data may be displayed via the channel 110. The valid data may be accessible to the user. In one embodiment, the valid data may not be accessible to one or more users in the blockchain ledger. In this way, data security may be provided to the valid data.

In one embodiment, the data may be in a format such as a default format and default ranges, that rely on a mutual contract between the product owner and the customer. Each attribute value of the product may have multiple default values or ranges which may be selected by the customer based on the requirement. Further, at time of uploading the data, the format and the ranges of the data may be checked. In one embodiment, if the data is not following the default format or the default ranges, then the data may not be uploaded. In this case, the data may be the invalid data. In another embodiment, if the data is following the default format or the default ranges, then the data may be uploaded. In this case, the data may be the valid data.

The data may comprise sensitive information. Further, the data may be masked by special characters for providing data security. In one example, construe the data comprising credit card information like 16 digit numbers. This data is not supposed to store as it is. In this scenario, some digits may be concealed by selecting the default parameter that can conceal/mask such kind of attribute values.

In one aspect, the data may be validated based on smart contract between the product owner and the customer. In one aspect, the smart contract may define mutual contracts between the customer and the product owner. The mutual contract may include a type and a default value for each attribute of the product, which can be updated dynamically according to the requirement.

Upon validating the data and concealing the private information, the valid data may be uploaded to the block chain ledger in the form of encrypted object. The data valid may comprise a requested product name, a product version, product attributes information, who requested the data, who owns the product information, transaction id and when it got uploaded to ledger(timestamp). In one example, a default format of a mail ID may be XXXXX@<domain>.XXX. In this case, format of all attribute values may be checked before uploading.

Further, the valid data may be displayed to the customer who holds the decrypted key of requested encrypted object.

Exemplary embodiments discussed above may provide certain advantages. Though not required to practice aspects of the disclosure, these advantages may include those provided by the following features.

Some embodiments of the system and the method is configured to validate data to be exchanged with users.

Some embodiments of the system and the method is configured to provide data security using a blockchain ledger.

Figure 3:
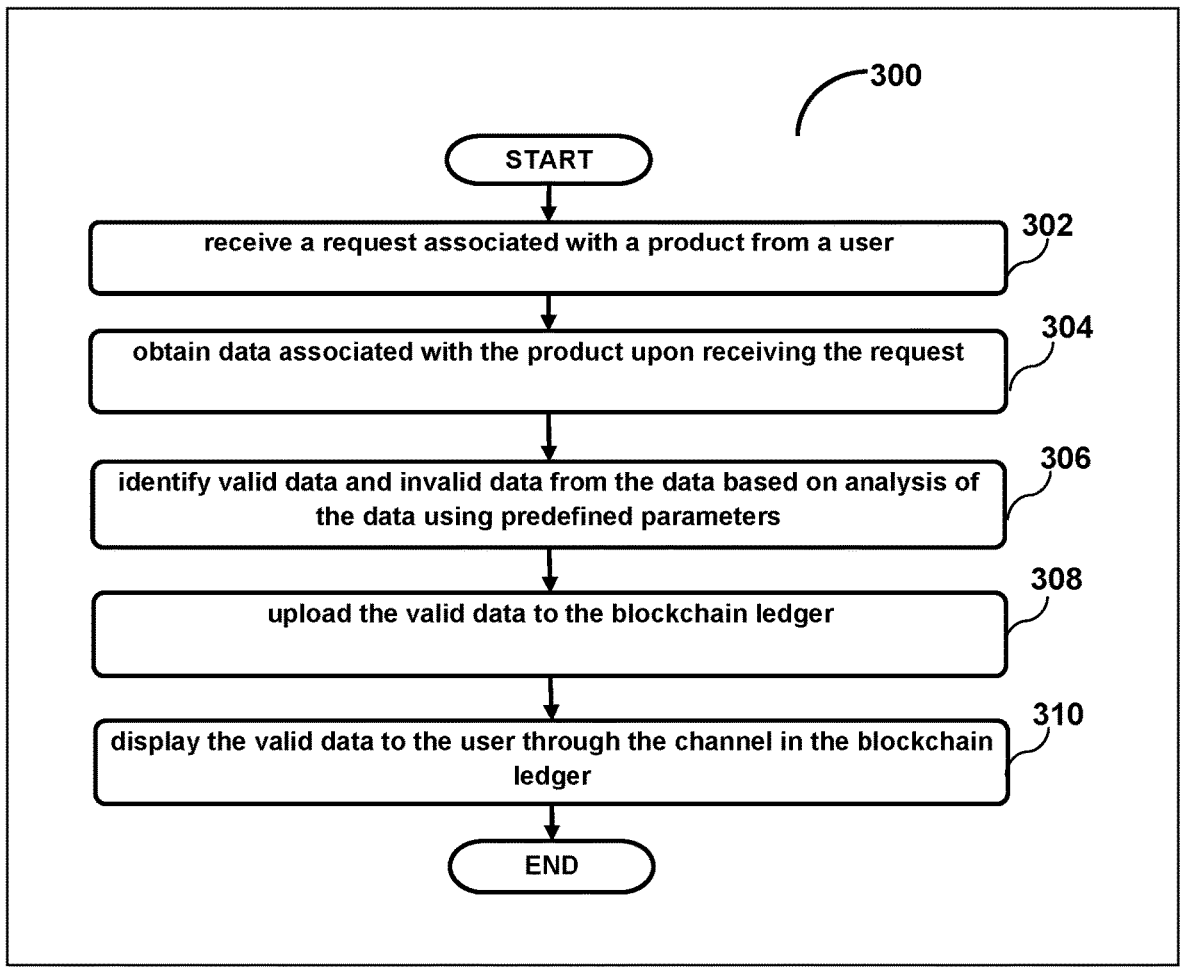
FIG. 3 illustrates a method for data security using a blockchain ledger, in accordance with an embodiment of the present subject matter.

Referring now to FIG. 3, a method 300 for data security using a blockchain ledger 108, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a request associated with a product may be received. In one implementation, the receiving module 212 may receive the request. The request may comprise a product name, a list of product attributes, a channel associated with the user, a blockchain ledger associated with the channel and the like.

At block 304, data associated with the product may be obtained. In one implementation, the receiving module 212 may obtain the data. The data may comprise a primary list of product attributes, a transaction ID, a time stamp and the like.

At block 306, valid data and invalid data may be identified. In one implementation, the identifying module 214 may identify the valid data and the invalid data from the data. The valid data and the invalid data may be identified based on an analysis of the data using predefined parameters.

At block 308, the valid data may be uploaded to a blockchain ledger 108. In one implementation, the uploading module 216 may upload the valid data to the blockchain ledger 108.

At block 310, the valid data may be displayed to the user. In one implementation, the displaying module 218 may display the valid data. The valid data may be displayed through the channel 110 in the blockchain ledger 108.

Although implementations for systems and methods for data security using a blockchain ledger have been described, it is to be understood that the appended claims are not necessarily limited to the specific features or methods described. Rather, the specific features and methods are disclosed as examples of implementations for data security using the blockchain ledger.

What is claimed is:

1. A method for data security using a blockchain ledger, the method comprising:

receiving, by a processor, a request associated with a product from a user, wherein the request comprises a product name, a list of product attributes, a channel associated with the user, and a blockchain ledger associated with the channel;

obtaining, by the processor, data associated with the product upon receiving the request, wherein the data comprises a primary list of product attributes, a transaction ID, and a time stamp;

identifying, by the processor, valid data from the data based on correct matching of the data with predefined parameters and identifying invalid data from the data based on incorrect matching of the data with the predefined parameters, wherein the predefined parameters comprise a set of rules and a set of contracts associated with the product owner and the user, wherein at least one contract from the set of contracts defines a default format and a default range for each attribute of the product, and wherein identifying the valid data from the data comprises:

dynamically updating the default format and the default range for the product in response to receiving the request for the product;

comparing a format and ranges of the data with the default format and the default ranges of at least one attribute of the product; and identifying the data as the valid data when the data follows the default format and the default ranges based on the comparing, wherein the format and range of the data, identified as the valid data, represents a requested product name, a product version, product attributes information, data requester information, data of product information owner, transaction identification (ID) and timestamp corresponding to upload on ledger;

uploading, by the processor, the valid data to the blockchain ledger, wherein uploading comprises:

masking sensitive information within the valid data using at least one special character; and displaying, by the processor, the valid data to the user having a decryption key corresponding to the valid data through the channel in the blockchain ledger, thereby providing data security.

2. The method as claimed in claim 1, further comprises assigning an error tag to the invalid data, wherein the invalid data is stored in a repository.

3. The method as claimed in claim 1, wherein the valid data is not accessible to one or more users associated with one or more channels in the blockchain ledger.

4. The method as claimed in claim 1, wherein the valid data indicates a successful transaction, and wherein the invalid data indicates a failed transaction.

5. The method as claimed in claim 1, wherein the displaying comprises making the valid data visible based on a role assigned to the user.

6. The method as claimed in claim 1, further comprising identifying the data as the invalid data, when the data fails to follow at least one of the default format and the default ranges.

7. A system for data security using a blockchain ledger, the system comprising:

a memory;

a processor coupled to the memory, wherein the processor is configured to execute programmed instructions stored in the memory to:

receive a request associated with a product from a user, wherein the request comprises a product name, a list of product attributes, a channel associated with the user, and a blockchain ledger associated with the channel;

obtain data associated with the product upon receiving the request, wherein the data comprises a primary list of product attributes, a transaction ID, and a time stamp;

identify valid data from the data based on correct matching of the data with predefined parameters and identifying invalid data from the data based on incorrect matching of the data with the predefined parameters, wherein the predefined parameters comprise a set of rules and a set of contracts associated with the product owner and the user, wherein at least one contract from the set of contracts defines a default format and a default range for each attribute of the product, and wherein identifying the valid data from the data comprises:

dynamically updating the default format and the default range for the product in response to receiving the request for the product;

comparing a format and ranges of the data with the default format and the default ranges of at least one attribute of the product; and identifying the data as the valid data when the data follows the default format and the default ranges based on the comparing, wherein the format and range of the data, identified as the valid data, represents a requested product name, a product version, product attributes information, data requester information, data of product information owner, transaction identification (ID) and timestamp corresponding to upload on ledger;

upload the valid data to the blockchain ledger, wherein uploading comprises:

masking sensitive information within the valid data using at least one special character; and display the valid data to the user having a decryption key corresponding to the valid data through the channel in the blockchain ledger, thereby providing data security.

8. The system as claimed in claim 7, further configured to assign an error tag to the invalid data, wherein the invalid data is stored in a repository.

9. The system as claimed in claim 7, wherein the valid data is not accessible to one or more users associated with one or more channels in the blockchain ledger.

10. The system as claimed in claim 7, wherein the valid data indicates a successful transaction, and wherein the invalid data indicates a failed transaction.

11. The system as claimed in claim 7, wherein the processor is further configured to make the valid data visible based on a role assigned to the user.

12. The system as claimed in claim 7, wherein the processor is further configured to identify the data as the invalid data, when the data fails to follow at least one of the default format and the default ranges.

* * * * *